United States Patent
Dropps

(10) Patent No.: US 11,556,478 B2
(45) Date of Patent: Jan. 17, 2023

(54) DIRTY CACHE LINE WRITE-BACK TRACKING

(71) Applicant: Hewlett Packard Enterprise Development LP, Houston, TX (US)

(72) Inventor: Frank R. Dropps, Annandale, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 2 days.

(21) Appl. No.: 17/085,321

(22) Filed: Oct. 30, 2020

(65) Prior Publication Data
US 2022/0138110 A1    May 5, 2022

(51) Int. Cl.
| | |
|---|---|
| G06F 12/00 | (2006.01) |
| G06F 12/0891 | (2016.01) |
| G06F 12/0873 | (2016.01) |
| G06F 11/30 | (2006.01) |
| G06F 12/02 | (2006.01) |
| G06F 9/30 | (2018.01) |
| G06F 12/0817 | (2016.01) |

(52) U.S. Cl.
CPC ...... *G06F 12/0891* (2013.01); *G06F 9/30047* (2013.01); *G06F 11/3037* (2013.01); *G06F 12/0238* (2013.01); *G06F 12/0824* (2013.01); *G06F 12/0873* (2013.01)

(58) Field of Classification Search
CPC ............ G06F 12/0891; G06F 9/30047; G06F 11/3037; G06F 12/0238; G06F 12/0824; G06F 12/0873
See application file for complete search history.

(56) References Cited

U.S. PATENT DOCUMENTS

| | | | |
|---|---|---|---|
| 2003/0084248 A1* | 5/2003 | Gaither | G06F 12/0804 711/133 |
| 2003/0086439 A1* | 5/2003 | Lin | H04W 72/1242 370/468 |
| 2010/0325367 A1* | 12/2010 | Kornegay | G06F 12/0804 711/143 |
| 2012/0079211 A1* | 3/2012 | Laycock | G06F 12/0833 711/143 |
| 2015/0234933 A1* | 8/2015 | Grover | G06F 16/9014 707/800 |
| 2018/0032439 A1 | 2/2018 | Jenne et al. | |

* cited by examiner

*Primary Examiner* — Gurtej Bansal
(74) *Attorney, Agent, or Firm* — Hewlett Packard Enterprise Patent Department

(57) ABSTRACT

A cache system may include a cache to store a plurality of cache lines in a write-back mode; dirty cache line counter circuitry to store a count of dirty cache lines in the cache, increment the count when a new dirty cache line is added to the cache, and decrement the count when an old dirty cache line is written-back from the cache; dirty cache line write-back tracking circuitry to store an ordering of the dirty cache lines in a write-back order; mapping circuitry to map the dirty lines into the ordering; and controller circuity to use the mapping circuity to identify an evicted dirty cache line in the ordering and remove the evicted dirty cache line from the ordering.

20 Claims, 5 Drawing Sheets

DIRTY CACHE LINE WRITE-BACK TRACKING

BACKGROUND

In a multi-processor system, having the ability to use non-volatile DIMM (NVDIMM) memory has many advantages. However, it can also push significant hold-up time requirements to the power supplies. As the cache memory sizes of the processor sockets grow, this power supply hold-up requirement can grow after system deployment with the introduction of upgraded non-volatile DIMMs into the system.

BRIEF DESCRIPTION OF THE DRAWINGS

Certain examples are described in the following detailed description and in reference to the drawings, in which.

DETAILED DESCRIPTION OF SPECIFIC EXAMPLES

Implementations of the described technology enable computers to limit the number of dirty cache lines in a computer's memory cache. Accordingly, the technology may enable limits to be placed on the hold-up time required to flush the cache to memory, thereby enabling manageable and predictable power supply requirements. Further, the technology allows the cache memory system to track and flush dirty cache lines in a desired flush order without disruption from the cache system's normal cache eviction policy.

In various implementations, the cache systems and operations described herein may be a component of a central processing unit (CPU) or system on a chip (SoC) (for example, an SoC having an integrated CPU and graphics processing unit (GPU)). For example, the cache systems may be a first level (L1), second level (L2), or third level (L3) or other memory cache.

Figure 1:
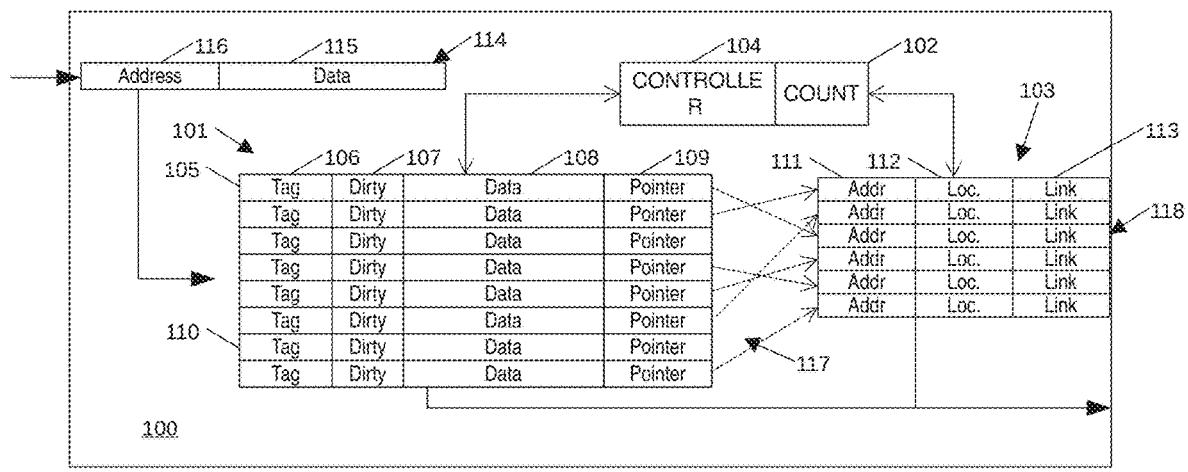
FIG. 1 illustrates an example cache system implemented in accordance with the described technology.

FIG. 1 illustrates an example cache system 100 implemented in accordance with the described technology. In some implementations, the system 100 is a component of a central processing unit (CPU) or system on a chip (SoC) (for example, a SoC having an integrated CPU and graphics processing unit (GPU)). For example, the cache system 100 may be a first level (L1), second level (L2), or lower level cache for a computer memory system.

In the illustrated example, the cache system 100 includes a fully associative cache 101. In other examples, the cache 101 may be organized in different manners. For example, cache 101 may be an n-way set associative cache or a direct mapped cache. Cache 101 is operated in a write-back mode. In this mode, writes to memory are stored in the cache 101 and are not committed to memory (or the next lower cache) until they are evicted from the cache (for example, to make room for new data in the cache), or flushed without eviction.

In the fully associative cache 101, cache lines corresponding to any memory address may be placed in any location within the cache 101. In this example, cache lines in cache 101, such as cache line 105 and 110 include tags 106, dirty flags 107 also referred to as modified flags, data 108, and pointers 109. In a fully associative cache 101, the tags 106 are the memory addresses 116 for reads and writes that are stored in the cache. In other implementations, the tags 106 are a subset of the address bits that are used to map reads and writes to particular locations of the cache. For example, in a set associative cache, a subset of the memory address bits map to a particular set within the cache. For example, a set associative cache with 4 sets might use 2 bits to map addresses to sets, with the remaining bits serving as the tags 106. The dirty flags 107 indicate whether a particular cache line is dirty (i.e. has been modified). For example, the dirty flags 107 may be a one-bit tag with a first value indicating that the line is dirty (e.g., a '1') and a second value (e.g., a '0') indicating that the line is not dirty. In the illustrated example, cache line 105 has its dirty flag 107 set (i.e., cache line 105 is dirty) and cache line 110 has its dirty flag 107 unset. The data 108 is a set of data beginning at a memory address. For example, the data 108 of each cache line may comprise a 64 byte set of data starting at the address indicated by tag 105. The tag likely does not include the lower address bits that address the bytes within the cache line. The pointers 109 are discussed below with respect to the mapping circuitry 117.

System 100 further includes dirty cache line counter circuitry 102. For example, the counter circuitry 102 may be a component of dirty cache line flushing controller 104, or may be an independent hardware block within cache system 100. The counter circuitry 102 stores a count of dirty cache lines in the cache. For example, the counter may be incremented when a new dirty cache line is added to the cache 101 and decremented when an existing (i.e., old) dirty cache line is written-back from the cache.

System 100 further includes dirty cache line write-back tracking circuitry 103 to store an ordering of the dirty cache lines from cache 101 in a write-back order. For example, the ordering may comprise a hardware-based write-back queue, such as a linked list implemented using a static random-access memory (SRAM). In the illustrated example, the tracking circuitry 103 comprises a linked list 103 that tracks the dirty cache lines in cache 101. Each entry of the linked list has an address 111, and index or other pointer 112 to the corresponding dirty cache line, and a link 113 to a next entry in the list (e.g., the address to the next entry in the list). In this example, the linked list 103 is ordered in a first-in, first-out (FIFO) ordering, such that the last item on the list corresponds to the oldest dirty cache line in the cache 101. In other examples, the system 100 may employ different write-back orderings. For example, the linked list 103 may be ordered in a least recently used (LRU) ordering. In this case, when a dirty cache line is updated with new data, the corresponding list entry is moved to the beginning of the list.

The system 100 further comprises mapping circuitry 117 to map the dirty lines into the ordering 103. In the illustrated example, the mapping circuitry 117 comprises pointers 109 to corresponding entries in the linked list 103. For example, the pointers 109 may comprise links to the corresponding entries in the list 103. For example, dirty cache line 105's pointer 109 points to the third entry in the list 103. The same tracking mechanism used to perform standard cache replacement algorithms could also be used to track dirty cache lines.

The system 100 further comprises controller circuitry 104 to use the mapping circuitry 117 to identify an evicted dirty cache line in the ordering and remove the evicted dirty cache line from the ordering. For example, if the cache 110 is full and the cache system 100 receives a new cache line 114 (for example, from a load or store operation or from a higher level cache evicting or flushing a cache line), the cache system 100 will select an entry of the cache 101 to be evicted to make room for the new line 114. The cache system 100 may utilize any number of different cache eviction algorithms. For example, the cache system 100 may utilize a least recently used (LRU) cache eviction technique, an approximated LRU technique, a random eviction technique, or any other type of eviction selection method. If the cache system 100 selects a dirty cache line 105 for eviction, the controller 104 uses the pointer 109 from the old dirty cache line 105 to determine the position of the corresponding entry 118 in the linked list 103. The controller 104 removes the corresponding entry 118 from the ordering by updating the link of the previous entry to the address of the next entry, and decrements the count stored by the counter 102. This process may be performed in parallel with the cache eviction process itself such that the removal of list element corresponding to the evicted line does not introduce delay into the operation of the cache.

If the value of the counter 102 exceeds a threshold, the controller 104 selects a dirty cache line from the cache 101 to be written back using the list 103. For example, the controller 104 may select the last entry of the list for writing back to the memory or the next level cache. In some implementations, the controller 104 may select more than one entry for writing back. For example, the controller 104 may write back a memory burst's worth of data. For example, the controller 104 may select the last 4 or 8 entries of the list 103 to write back, to accommodate a 4 or 8 word memory burst write. The controller then clears the dirty flag(s) of the written back lines.

The write-back threshold may be set based on a desired hold up time for the overall computer system given various requirements, such as power requirements to flush the system caches, persistence operations on the memory (for example, in the case of a flash-backed DRAM NVDIMM), storage cache flushes, and other requirements for power in the event of a system crash, power loss, or other such system event. In some implementations, the threshold may be programmable during deployment (for example, via BIOS configuration), may be automatically determined based on system parameters (such as power and hardware infrastructure), or set to a pre-programmed value. For example, the threshold may be set to ¼, ½, or other fraction of the size of the cache.

Figure 2:
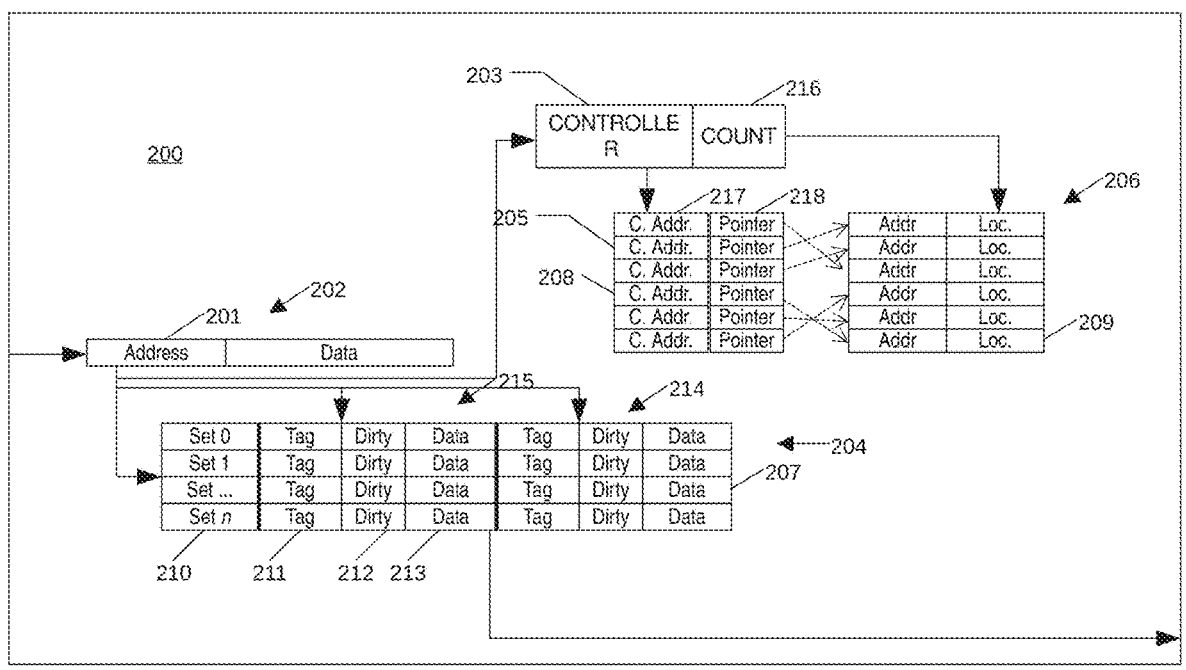
FIG. 2 illustrates a second example cache system.

FIG. 2 illustrates a second example cache system 200. Like the example of FIG. 1, the cache system 200 includes a mapping between the dirty cache lines in a cache 204 and a write-back ordering that enables it to remove an element of the ordering when a dirty cache line is evicted.

In the illustrated example, the system 200 includes a set-associative cache 204. While, the cache 204 is illustrated as having two ways 214, 215, systems 200 may utilize any n-way cache or a fully associative cache. Here, a portion of the address 201 of an incoming line 202 are used to map to a set 210 within the cache 204, a second portion are used to map to a way 214, 215, and the remaining bits are used as a tag 211. As described with respect to FIG. 1, cache lines in the cache 204 also include data 213 and dirty flags 212.

The cache system 200 includes counter circuitry 216 to maintain and store a count of the number of dirty lines in the cache 201. For example, the counter 216 may be implemented as described with respect to FIG. 1. The system 200 further includes dirty cache line write-back tracking circuitry 206. For example, the circuitry 206 may comprised a linked list of the dirty cache lines, where the linked list is ordered by the desired write-back policy. The circuitry 206 may be further as described with respect to FIG. 1. For example, the list 206 may be organized from oldest to newest dirty cache line.

The cache system 200 further includes mapping circuitry 205 that maps the dirty cache lines in the cache into the write back ordering 206. In this implementation, the mapping circuitry 205 comprises a second linked list 205 that is sorted by the addresses 217 of the dirty cache lines. The second list 205 further includes pointers 218 to the corresponding entries of the first list 206.

When a dirty cache line is evicted from the cache 204, the controller circuitry 203 searches the address-sorted (217) linked list 205 to identify the corresponding entry. The controller then uses the pointer 218 from the found entry to identify the corresponding location in the write-back linked list 206. Those entries in both lists are then removed from their corresponding lists 205, 206. As an example, if cache line 202 is received and causes an eviction of dirty cache line 207, the controller 203 searches the addresses 217 in the linked list 205 and finds a match 208. The controller then follows the pointer of the match 208 to identify entry 209 within the second linked list 206. The controller then removes both entries 208 and 209 from their respective lists and counter 216 decrements the dirty line count. In some implementations, the process of searching the linked list 205 may be performed in parallel with eviction process.

Figure 3:
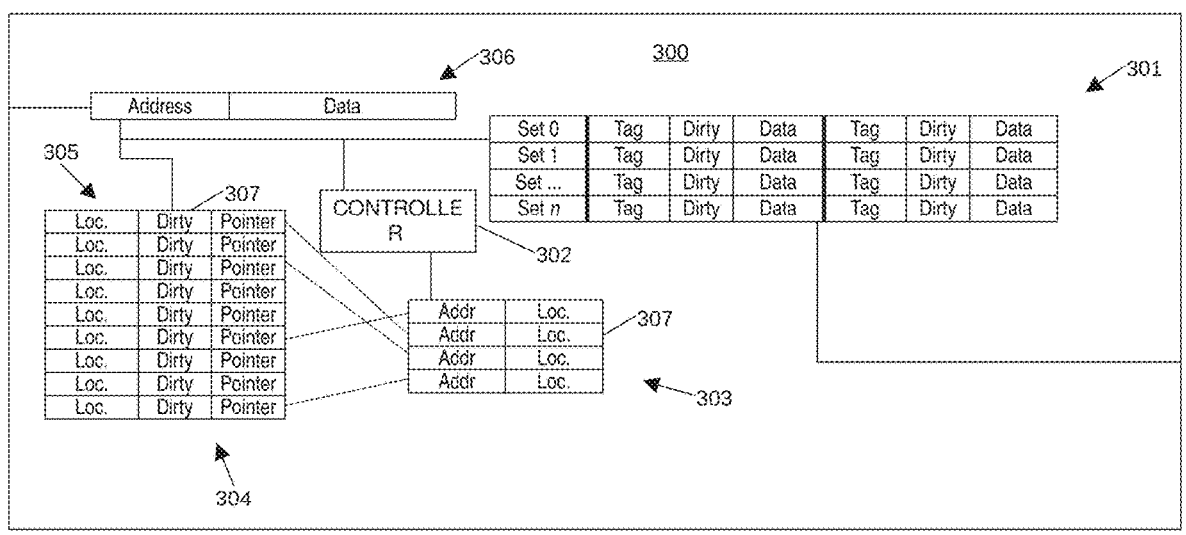
FIG. 3 illustrates another example cache system.

FIG. 3 illustrates another example cache system 300. Like the examples of FIGS. 1 and 2, the cache system 300 includes a mapping between the dirty cache lines in a cache 301 and a write-back ordering 303 that enables it to remove an element of the ordering when a dirty cache line is evicted.

The illustrated example system 300 includes a set-associative cache 301. In other implementations, the cache 301 may be a fully associative cache. For example, the cache 301 may be as described with respect to cache 201 of FIG. 2 or 101 of FIG. 1.

Similar to the examples of FIGS. 1 and 2, the system 300 includes a write-back controller 302 that maintains a count of the total number of dirty lines in cache 301 and an ordering 303 of the dirty lines in cache 301. For example, the ordering 303 may comprise a linked list or other data structure. The system 300 further comprises mapping circuitry 304 to map the dirty lines in the cache 301 into the tracking structure 303.

In this example, mapping circuitry 304 comprises dirty flags and pointers stored in an eviction data structure 305. For example, the data structure 305 may comprise a queue according to the system 300's cache replacement policy, such as a least recently used (LRU), pseudo-LRU, least frequently used (LFU) or other replacement policy.

In this example, when a cache line 306 is received by the system 300 and the cache 301 is full, the controller 302 will select an entry 307 to be evicted from the cache 301. If corresponding dirty flag for the location indicates that the to-be-evicted cache line is dirty, then the controller uses the entry 307's pointer to identify entry 307 in the write-back ordering 303 and to remove the entry. The controller 302 then decrements its count of dirty lines maintained in its counter.

Figure 4:
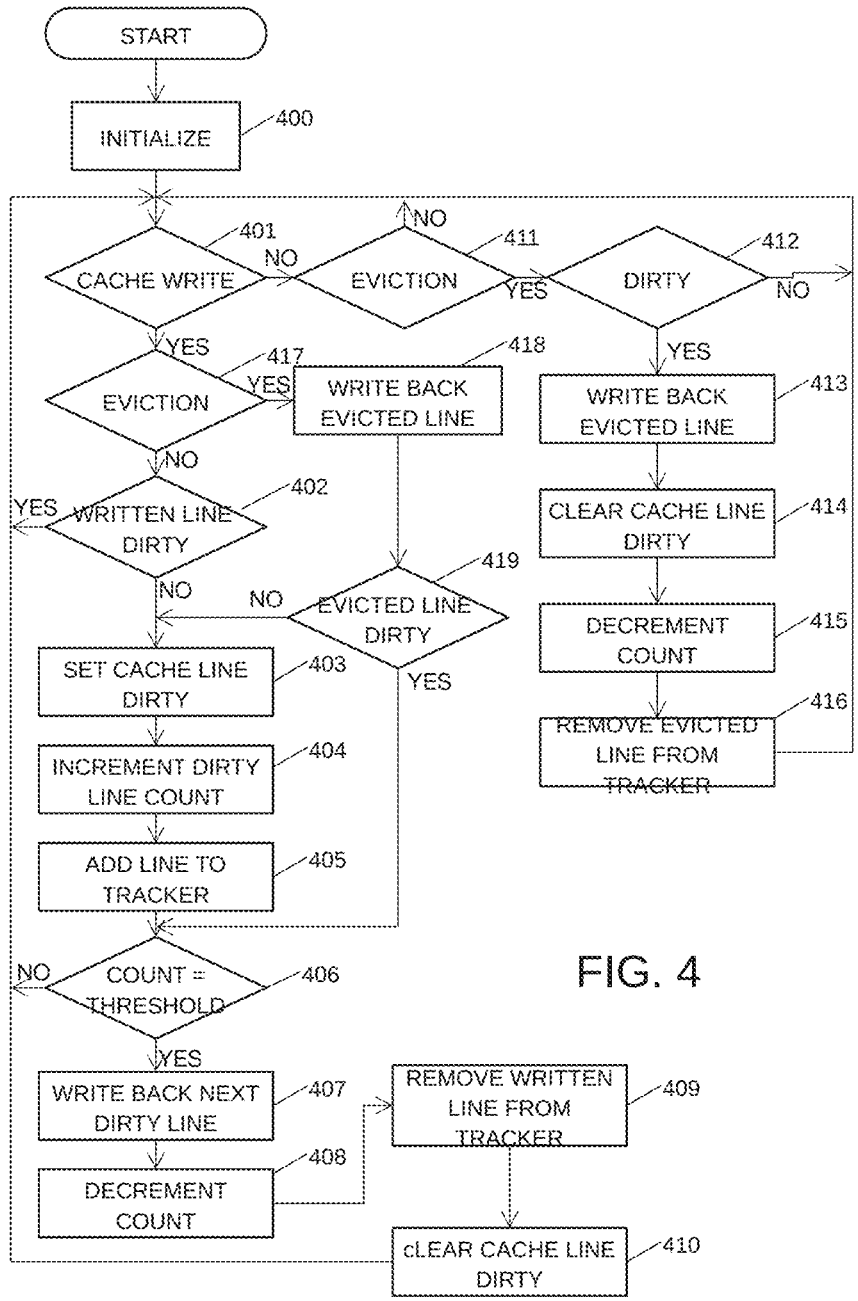
FIG. 4 illustrates an example method of cache system operation.

FIG. 4 illustrates an example method of cache system operation. For example, the method of FIG. 4 may be performed by any of the various types of cache systems described herein.

The method begins with block 400, which includes initializing the cache system. For example, the initialization may include setting the dirty line counter to zero. Block 400 may include other initialization steps, such as setting the threshold for writing back dirty cache lines.

After the initialization 400, the method proceeds to the operating loop. In block 401, the system receives a cache line to be placed in the cache. If the cache line is received in an operation that creates dirty data such as a write operation, the method proceeds to block 417. If the cache line is received in an operation that does not create dirty data, such as a read operation, the method proceeds to block 411.

In block 417, the system determines whether the cache line write is an update to an entry already in the cache or whether the write is to a new address not already in the cache that requires eviction of an existing entry to make room for the new cache line. If the address doesn't match an existing entry and there is not any empty cache locations, the method proceeds to block 418. In block 418, the system writes back the evicted cache line and proceeds to block 419. In block 419, the system determines whether the evicted cache line was already being tracked as dirty. If the evicted cache line was not determined to be dirty the system proceeds to blocks 403-405 to update the dirty cache line tracking. If the evicted cache line was determined to be dirty the system proceeds to block 406 as the tracking and count are already correct.

In block 402, the system determines whether the cache line write is to an entry that that is already dirty. In other words, whether the cache line write is an update to an entry already being track as dirty in the cache or whether the write is to a new dirty cache line. In this example, the write-back tracking list is implemented in a manner that is not impacted by a new write to a pre-existing line. For example, the write-back list may be arranged to write back from oldest to youngest dirty cache line.

In other implementations, the write-back tracking list may be implemented in a manner that uses information conveyed by the write to an existing location. For example, the list may be implemented using frequency of writes to a location, such as a least commonly used ordering, or recency of a write to a location, such as a least frequently used ordering. In these implementations, the method may include updating the write-back tracking list. For example, in an LRU implementation, the method may include moving the updated cache line to the end of the tracking list.

In the illustrated example, if the written line is an update to a dirty line, the method returns to the beginning of the loop and waits for a next cache operation 401. If the written line is not already dirty the method proceeds to block 403. For example, the method may proceed to block 403 if the received write is to an address not currently in the cache, or is to an address whose data is not dirty (e.g., data that had been read in or previously written back).

In block 403, the cache line is flagged as dirty, for example by setting a tag bit in the cache line's cache entry. In block 404, the dirty line cache line count is incremented by one. In block 405, an entry of the new cache line is added to the dirty cache line tracker.

In block 406, the system determines if the dirty line count is equal to or greater than the write back threshold. If so, the system proceeds to blocks 407-410. If not, the system returns to the beginning of the loop to wait for the next cache operation.

In this example, in block 407, the system writes back the next dirty cache line from the system. The system then decrements the count and removes the written line from the tracker in blocks 408 and 409, respectively. Finally, in block 410 the system clears the dirty flag from the cache entry of the written back line. In other examples, the system may write back a plurality of cache lines in response to exceeding the threshold in block 406. For example, the plurality may be set as a parameter during initialization. In other implementations, the system may perform other techniques for writing back dirty lines. For example, the system may have a first lower threshold which, when exceeded, causes the cache system to write back elements during periods when the memory bus is idle or under a threshold utilization. The threshold in block 406 may then serve as a hard threshold which triggers immediate write back.

Returning to block 401, if the cache operation is not a write, the system proceeds to the branch beginning with block 411. In block 411, the system determines if the cache operation causes a cache eviction. If so, then the method continues to block 412. If not, then the method returns to waiting for the next cache operation in block 401.

In block 412, the system determines whether the evicted line is dirty. If so, the method proceeds to block 413-416. If not, the method returns to waiting for the next cache operation to repeat block 401. In block 413, the system writes back the evicted cache line. In block 414, the system clears the dirty flag from the cache entry. In block 415, the system decrements the dirty line count. In block 416, the system removes the evicted line from the dirty cache line tracking structure.

Figure 5:
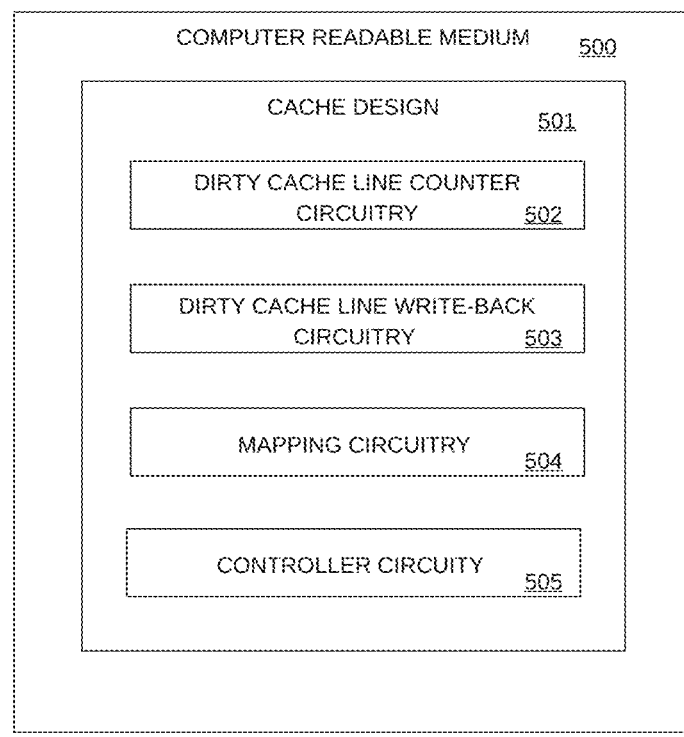
FIG. 5 illustrates an example non-transitory computer readable medium storing a design for a hardware implementation for a device as described with respect to FIGS. 1-3, which may operate as described with respect to FIG. 4.

FIG. 5 illustrates an example non-transitory computer readable medium 500 storing a design for a hardware implementation for a device as described with respect to FIGS. 1-3, which may operate as described with respect to FIG. 4. For example, the medium 500 may comprise computer storage or memory, or a portable computer readable storage. The design 501 may be for a portion or block of an integrated circuit (IC), an IC in its entirety, or a device comprise multiple ICs. The design 501 may be stored in various formats. For example, the design 501 may comprise a synthesizable register transfer level (RTL) block design, gate-level netlist, or a transistor layout. Although illustrated as separate blocks 502-505, in actual implementations one or more of the design portions may be combined with each other or with the designs for other cache components.

In the illustrated example, the design 501 includes a design 502 for dirty cache line counter circuitry. For example, the design 502 may be for counter circuitry to store a count of dirty cache lines in a cache, increment the count when a new dirty cache line is added to the cache, and decrement the count when an old dirty cache line is written-back from the cache.

The example design 501 includes a design 503 for dirty cache line write-back circuitry. As described above, the write-back circuitry is to store an ordering of the dirty cache lines in a write-back order. For example, the design 503 may include a design for an SRAM-based linked list and controller circuitry to implement the described functions.

The example design 501 further includes a design 504 for mapping circuitry. As described above, the mapping circuitry is to map the dirty lines into the ordering. For example, the design 504 may include a cache design that has fields for each cache entry to store a pointer to the ordering. As another example, the design 504 may be for a linked list sorted in cache line address order.

The example design 501 further comprises a design 505 for controller circuitry. The controller is to use the mapping circuity to identify an evicted dirty cache line in the ordering and remove the evicted dirty cache line from the ordering. For example, the design 505 may be for a portion of a CPU's cache controller or for a separate write-back controller.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system comprising:
 a cache to store a plurality of cache lines in a write-back mode;
 dirty cache line counter circuitry to:
  store a count of dirty cache lines in the cache;
  increment the count when a new dirty cache line is added to the cache; and
  decrement the count when an old dirty cache line is written-back from the cache;
 dirty cache line write-back tracking circuitry to store an ordered list tracking the dirty cache lines in the cache, wherein the ordered list comprises a plurality of entries containing respective addresses associated with the dirty cache lines in the cache, the ordered list representing a write-back order of the dirty cache lines;
 mapping circuitry to store pointers that map the dirty cache lines in the cache to the plurality of entries of the ordered list; and
 a controller to:
  detect a selection of a given cache line of the plurality of cache lines for eviction from the cache, the given cache line selected for eviction according to an eviction policy;
  determine whether the given cache line is a dirty cache line of the dirty cache lines;
  in response to determining that the given cache line selected for eviction is the dirty cache line, use a given pointer of the pointers in the mapping circuitry to identify a given entry in the ordered list corresponding to the given cache line selected for eviction from the cache, the given pointer referring to a position of the given entry in the ordered list; and
  remove the identified given entry from the ordered list to produce an updated ordered list that represents an updated write-back ordering of a remainder of the dirty cache lines after the eviction of the given cache line.

2. The system of claim 1, wherein the mapping circuitry is to sort the pointers based on addresses of the dirty cache lines.

3. The system of claim 1, wherein the mapping circuitry is to store the pointers with the dirty cache lines.

4. The system of claim 1, wherein the eviction policy specifies an eviction of cache lines from the cache in an eviction order that is independent of the write-back order represented by the ordered list.

5. The system of claim 1, wherein the ordered list comprises a linked list comprising the plurality of entries, wherein each entry of the plurality of entries comprises a link referring to a next entry in the linked list,
 wherein prior to the removing of the identified given entry, a further entry of the plurality of entries comprises a link referring to the identified given entry, and
 wherein the controller is to remove the identified given entry from the linked list by updating the link in the further entry to refer to an entry of the linked list that is different from the identified given entry.

6. The system of claim 1, wherein the controller is to:
 detect that the count of the dirty cache lines exceeds a threshold; and
 in response to detecting that the count of the dirty cache lines exceeds the threshold, write back a dirty cache line corresponding to a next entry in the updated ordered list.

7. A method comprising:
 storing a plurality of cache lines in a cache;
 maintaining, by a system comprising a hardware processor, an ordered list tracking dirty cache lines within the cache, wherein the ordered list comprises a plurality of entries containing respective addresses associated with the dirty cache lines in the cache, the ordered list representing a write-back order of the dirty cache lines;
 storing, by the system, pointers that map the dirty cache lines in the cache to the plurality of entries of the ordered list detecting, by the system, a selection of a given cache line of the plurality of cache lines for eviction from the cache, the given cache line selected for eviction according to an eviction policy;
 determining, by the system, whether the given cache line is a dirty cache line of the dirty cache lines;
 in response to determining that the given cache line selected for eviction is the dirty cache line, using a given pointer of the pointers to identify a given entry in the ordered list corresponding to the given cache line selected for eviction from the cache, the given pointer referring to a position of the given entry in the ordered list; and
 removing, by the system, the identified given entry from the ordered list to produce an updated ordered list that represents an updated write-back ordering of a remainder of the dirty cache lines after the eviction of the given cache line.

8. The method of claim 7 further comprising:
 maintaining a count of the dirty cache lines in the cache;
 incrementing the count when a new dirty cache line is added to the cache; and
 decrementing the count when an old dirty cache line is written-back from the cache.

9. The method of claim 8, comprising sorting the pointers based on addresses of the dirty cache lines.

10. The method of claim 8, comprising:
 in response to determining that the given cache line selected for eviction is not a dirty cache line, proceeding, by the system, to wait for a next cache operation without removing an entry from the ordered list.

11. The method of claim 8, wherein the eviction policy specifies an eviction of cache lines from the cache in an eviction order that is independent of the write-back order represented by the ordered list.

12. The method of claim 8, further comprising:
 detecting, by the system, that the count of the dirty cache lines exceeds a threshold; and
 in response to detecting that the count of the dirty cache lines exceeds the threshold, writing back a dirty cache line corresponding to a next entry in the the updated ordered list.

13. The method of claim 12, comprising adjusting the threshold based on a size of the cache.

14. The method of claim 7, wherein the ordered list comprises a linked list comprising the plurality of entries, wherein each entry of the plurality of entries comprises a link referring to a next entry in the linked list,
 wherein prior to the removing of the identified given entry, a further entry of the plurality of entries comprises a link referring to the identified given entry, and wherein the removing of the identified given entry from the linked list comprises updating the link in the further entry to refer to an entry of the linked list that is different from the identified given entry.

15. A non-transitory computer readable medium comprising instructions that upon execution cause a system to:
store a count of dirty cache lines in a cache that contains a plurality of cache lines;
increment the count when a new dirty cache line is added to the cache; and
decrement the count when an old dirty cache line is written-back from the cache;
store an ordered list tracking the dirty cache lines in the cache, wherein the ordered list comprises a plurality of entries containing respective addresses associated with the dirty cache lines in the cache, the ordered list representing a write-back order of the dirty cache lines;
store pointers that map the dirty cache lines in the cache to the plurality of entries of the ordered list;
detect a selection of a given cache line of the plurality of cache lines for eviction from the cache, the given cache line selected for eviction according to an eviction policy;
determining, by the system, whether the given cache line is a dirty cache line of the dirty cache lines;
in response to determining that the given cache line selected for eviction is the dirty cache line, using a given pointer of the pointers to identify a given entry in the ordered list corresponding to the given cache line selected for eviction from the cache, the given pointer referring to a position of the given entry in the ordered list; and
remove the identified given entry from the ordered list to produce an updated ordered list that represents an updated write-back ordering of a remainder of the dirty cache lines after the eviction of the given cache line.

16. The non-transitory computer readable medium of claim 15, wherein the instructions upon execution cause the system to sort the pointers based on addresses of the dirty cache lines.

17. The non-transitory computer readable medium of claim 15, wherein the instructions upon execution cause the system to:
in response to determining that the given cache line selected for eviction is not a dirty cache line, proceed to wait for a next cache operation without removing an entry from the ordered list.

18. The non-transitory computer readable medium of claim 15, wherein the eviction policy specifies an eviction of cache lines from the cache in an eviction order that is independent of the write-back order represented by the ordered list.

19. The non-transitory computer readable medium of claim 15, wherein the ordered list comprises a linked list comprising the plurality of entries, wherein each entry of the plurality of entries comprises a link referring to a next entry in the linked list,
wherein prior to the removing of the identified given entry, a further entry of the plurality of entries comprises a link referring to the identified given entry, and
wherein the removing of the identified given entry from the linked list comprises updating the link in the further entry to refer to an entry of the linked list that is different from the identified given entry.

20. The non-transitory computer readable medium of claim 15, wherein the instructions upon execution cause the system to:
detect that the count of dirty cache lines exceeds a threshold; and
in response to detecting that the count of dirty cache lines exceeds the threshold, write back a dirty cache line corresponding to a next entry in the updated ordered list.

* * * * *